United States Patent [19]

Yoshida et al.

[11] Patent Number: 5,529,651
[45] Date of Patent: Jun. 25, 1996

[54] PROCESS FOR PRODUCTION OF JOINED CERAMIC BODY

[75] Inventors: Toshihiro Yoshida, Nagoya; Keiichiro Watanabe, Kasugai, both of Japan

[73] Assignee: NGK Insulators, Ltd., Nagoya, Japan

[21] Appl. No.: 341,074

[22] Filed: Nov. 17, 1994

[30] Foreign Application Priority Data

Nov. 17, 1993 [JP] Japan ................................. 5-288324

[51] Int. Cl.$^6$ ............................................... C04B 37/00
[52] U.S. Cl. ............................ 156/85; 156/86; 156/89; 264/57
[58] Field of Search ..................... 156/89, 85, 84, 156/86; 264/57, 60

[56] References Cited

U.S. PATENT DOCUMENTS

| | | | |
|---|---|---|---|
| 4,299,638 | 11/1981 | Matsuhisa | 156/85 |
| 4,330,496 | 5/1982 | Desplanches et al. | 264/57 |
| 4,769,097 | 9/1988 | Wada | 156/85 |
| 4,913,754 | 4/1990 | Duncan et al. | 156/85 |
| 5,106,434 | 4/1992 | Ishida et al. | 148/127 |
| 5,106,550 | 4/1992 | Yogo et al. | 264/60 |
| 5,209,525 | 5/1993 | Ito | 285/137.1 |
| 5,306,368 | 4/1994 | Yamada et al. | 156/86 |

FOREIGN PATENT DOCUMENTS

| | | |
|---|---|---|
| 383181A1 | 3/1990 | Germany . |
| 4110141A1 | 10/1991 | Germany . |
| 55-116681 | 9/1980 | Japan . |

OTHER PUBLICATIONS

Patent Abstracts of Japan, C-1034, Mar. 12, 1993, vol. 17, No. 119; JP-A 4-300262, "Siliceous Carbide Jig."

*Primary Examiner*—Christopher A. Fiorilla
*Attorney, Agent, or Firm*—Ronald J. Kubovcik

[57] ABSTRACT

A process for producing a joined ceramic component having a plurality of parallel ceramic tubes and two perforated ceramic plates joined to the both ends of said ceramic tubes, which process comprises: arranging two unsintered ceramic plates each having a plurality of holes, in parallel to each other and also to the floor surface with a given distance provided between the upper plate and the lower plate; inserting a plurality of sintered ceramic tubes into the holes of the upper and lower plates so that the tubes are arranged vertically to the floor surface and in parallel to each other; and sintering the resulting material to join the tubes and the plates into one piece by utilizing the difference in sintering shrinkage factor between them, in which process the sintering is conducted in a state that each tube is hanged from the upper plate and that the lower end of each tube is in one hole of the lower plate placed on or above a setter, with a certain distance provided between the lower end of each tube and the setter so that they do not come in contact with each other during the sintering.

10 Claims, 3 Drawing Sheets

PROCESS FOR PRODUCTION OF JOINED CERAMIC BODY

BACKGROUND OF THE INVENTION AND THE RELATED ART

The present invention relates to a process for producing a joined ceramic component consisting of a plurality of parallel ceramic tubes and two perforated ceramic plates joined to the both ends of said tubes.

Ceramics, irrespective of their compositions (oxides or nonoxides), have high heat resistance and high heat-insulating property; electrical and electronic properties such as insulation, conductivity, magnetic and dielectric properties and the like; and excellent mechanical properties such as wear resistance and the like. Hence, ceramics usable as materials for various structures have been developed and are in actual use.

When a ceramic is used as a material for mechanical part or structural member, the mechanical part or the structural member is required to have various shapes and also it is necessary to use various parts or various structural members in combination. Therefore, it becomes necessary to integrate different ceramic parts or members into one piece when one-piece molding is difficult or impossible.

Joined components consisting of a flat-plate-like member and a member of other shape are used as mechanical parts or structural members in large amounts. There are used, in many cases, materials consisting of two perforated plates and a plurality of parallel tubes each inserted into each one hole of the two plates. In shell-and-tube type ceramic heat exchangers, for example, there are used a member consisting of a plurality of parallel ceramic tubes and two perforated plates, joined to the both ends of said tubes.

For production of such a joined ceramic component consisting of a plurality of parallel ceramic tubes and two perforated plates, bonded to the both ends of said tubes, there is known a process which comprises inserting sintered tubes into each hole of two unsintered ceramic plates 1 (as shown in FIG. 4) each having a plurality of holes 3, in such a way that the two ends of each tube are flush with the outer surfaces of the perforated plates 1, and then sintering the resulting material to join the tubes and the plates into one piece by utilizing the difference in sintering shrinkage factor between them (such a bonding process utilizing the difference in sintering shrinkage factor is hereinafter called "sintering joining").

The above sintering is conducted generally in a state that, as shown in FIG. 5, (1) a setter 4 is placed in a sagger having a sealed structure [this sealed structure is for the prevention of incoming of contaminants (e.g. carbon, etc. which are furnace materials) as well as for the control of atmosphere], (2) two perforated plates 1a and 1b are arranged, by the use of jigs 5, in parallel to each other and also to the setter 4 with a given distance provided between the two perforated plates and with the lower perforated plate 1b contacted with the setter 4, and (3) tubes 2 are inserted into the holes of the two perforated plates 1a and 1b in parallel to each other and vertically to the floor surface.

The reason why the lower perforated plate is not directly placed on the sagger and the setter is provided between the lower perforated plate and the sagger, is that when sintering is conducted in a state that the sagger and the lower perforated plate are in contact with each other, the smooth shrinkage of the lower perforated plate during sintering is prevented by the friction between the sagger and the lower perforated plate, causing deformation of the lower perforated plate. In order to prevent such deformation, sintering is conducted generally in a state that a setter made of a material having about the same sintering shrinkage factor as the perforated plates (the material is basically the same as for the perforated plates) is placed between the sagger and the lower perforated plate.

In the above process, the perforated unsintered ceramic plates having a large sintering shrinkage factor cause shrinkage during the sintering to tighten the tubes, whereby joining between the plates and the tubes is achieved. However, since the center of shrinkage of each plate is at the center of thickness of each plate, the lower plate 1b at the lower ends of the tubes rises from the setter 4 as shown in FIG. 6, during the sintering and, as a result, only the lower ends of the tubes 2 come into contact with the setter 4. Consequently, the setter 4 comes to support the total weight of the two plates 1a and 1b, the tubes 2 and the jigs 5 only at the small areas contacting with the tubes 2; the concentration of the total weight on the small contact areas destroys the setter 4; the destruction of the setter 4 incurs the cracking of the lower plate 1b.

SUMMARY OF THE INVENTION

The present invention has been made in view of the above-mentioned problems of the prior art. The object of the present invention is to produce an excellent joined ceramic component consisting of a plurality of parallel ceramic tubes and two perforated ceramic plates joined to the both ends of the tubes, by utilizing the difference in sintering shrinkage factor between the tubes and the plates, in which process the concentration of the total weight of plates, tubes and jigs on the limited small areas of setter during sintering and joining is eliminated and resultantly the destruction of setter and the cracking of lower plate are prevented.

The present invention provides a process for producing a joined ceramic component having a plurality of parallel ceramic tubes and two perforated ceramic plates joined to the both ends of said ceramic tubes, which process comprises arranging, by an appropriate means, two unsintered ceramic plates each having a plurality of holes, in parallel to each other and also to the floor surface with a given distance provided between the upper plate and the lower plate, inserting a plurality of sintered ceramic tubes into the holes of the upper and lower plates so that the tubes are arranged vertically to the floor surface and in parallel to each other, and sintering the resulting component to join the tubes and the plates into one piece by utilizing the difference in sintering shrinkage factor between them, in which process the sintering is conducted in a state that each tube is hanged from the upper plate by an appropriate means and that the lower end of each tube is in one hole of the lower plate placed on or above a setter, with a certain distance provided between the lower end of each tube and the setter so that they do not come in contact with each other during the sintering.

DETAILED DESCRIPTION OF THE INVENTION

Figure 1:
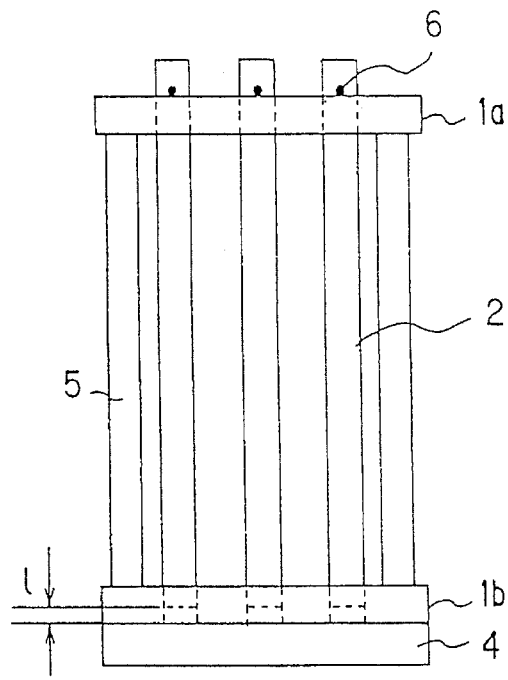
FIG. 1 is a side view showing an example of the present process for producing a joined ceramic component.
Figure 2:
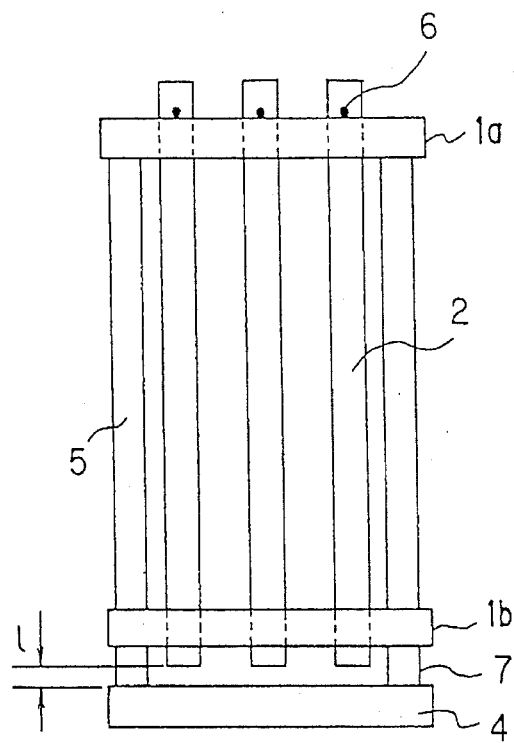
FIG. 2 is a side view showing other example of the present process for producing a joined ceramic component.
Figure 5:
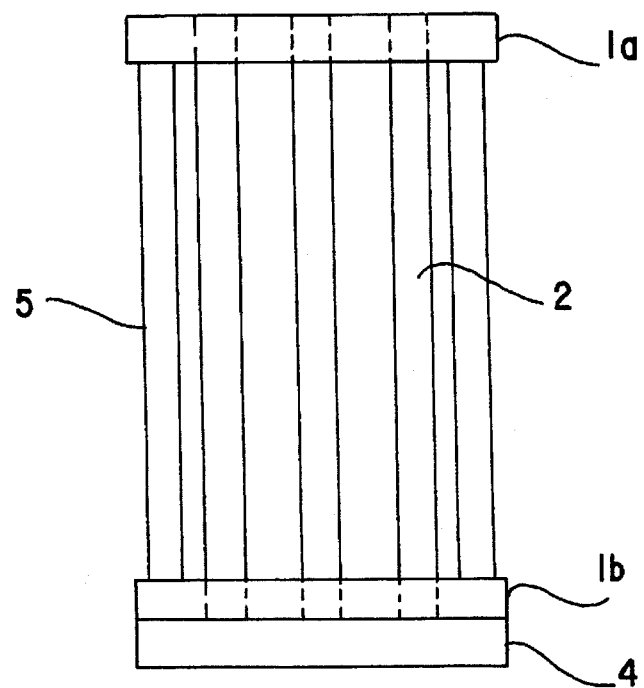
FIG. 5 is a side view showing the conventional process for producing a joined ceramic component.
Figure 6:
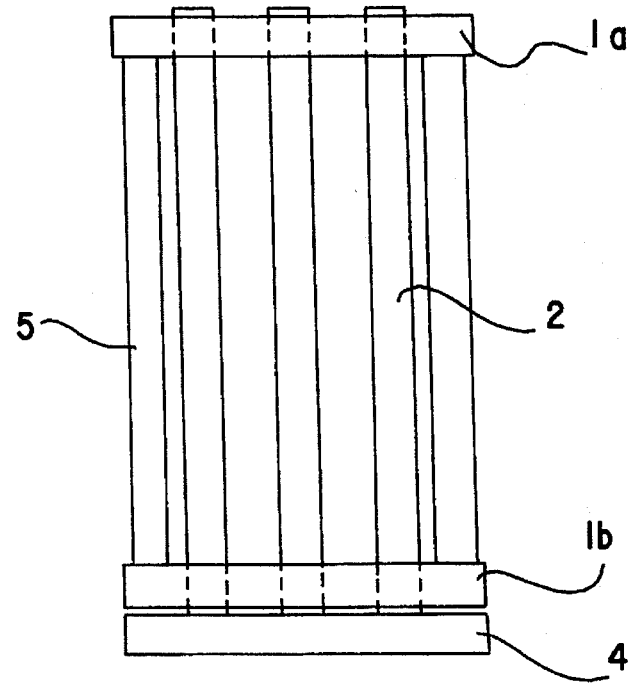
FIG. 6 is a side view showing a certain stage during sintering in the conventional process for producing a joined ceramic component.

In the present invention, sintering is not conducted in the same manner as in the conventional process, i.e. in a state that, as shown in FIG. 5, the lower end of each tube 2 is inserted into one hole of a lower perforated plate 1b to the extent that said lower end is flush with the lower surface of the lower perforated plate 1b (in other words, said lower end is in contact with a setter 4); but sintering is conducted in a state that, as shown in FIG. 1 or 2, each tube 2 is hanged from an upper perforated plate 1a fixed by jigs 5 and that the lower end of each tube 2 is inserted into one hole of a lower perforated plate 1b placed on or above a setter 4 with a given distance provided between the lower end of each tube 2 and the setter 4. Thus, by conducting sintering with a given distance (i.e. a given gap) provided between the lower end of each tube 2 and the setter 4, there occurs no contact between the setter 4 and each tube 2, and the lower perforated plate 1b comes into face contact with the setter 4 or only the jigs come into contact with the setter 4 during the sintering. Consequently, the total weight of jigs, perforated plates and tubes is placed on the surface of the setter 4 not unevenly but almost uniformly, inviting neither setter destruction nor plate destruction.

As the specific means for hanging each tube from the upper perforated plate and providing a given distance between the lower end of each tube and the setter, there can be mentioned, for example, the following means shown in FIG. 1. That is, a pin 6 is inserted into a hole made in the upper end portion of each tube 2; each tube 2 is inserted into one hole of the upper-perforated plate 1a and hanged therefrom by placing the both ends of the pin 6 on the plate 1a; the lower end of each tube 2 is inserted into one hole of the lower perforated plate 1b to an appropriate depth of the hole. In this case, the distance between the lower end of each tube 2 and the setter 4, i.e. the distance l between the lower end of each tube 2 and the upper surface of the setter 4 is a distance determined beforehand by experiment or calculation so that the lower end of each tube 2 does not project from the lower surface of the lower perforated plate 1b when the plate 1b causes shrinkage during sintering. The upper end portion of each tube 2 projecting from the upper surface of the upper perforated plate 1a can be, if necessary, removed after sintering by cutting.

FIG. 2 shows other example of the specific means for hanging each tube from the upper perforated plate and providing a given distance between the lower end of each tube and the setter. In this example, the hanging of each tube 2 is conducted in the same manner as in FIG. 1, but the lower perforated plate 1b and the setter 4 are separated by jigs 7 to provide a given distance l between the lower end of each tube 2 and the setter 4.

The ceramic used in the present joined ceramic component may be any ceramic of oxide type or nonoxide type, and can be appropriately selected depending upon the requirements for the present joined ceramic component, i.e. the type, mechanical strengths, etc. of the structural member in which the present joined ceramic component is used. When the present joined ceramic component is used in, for example, engines, industrial machinery and heat exchangers, there is used, as the ceramic, silicon nitride or silicon carbide both of high strength and high heat resistance. The perforated plates and the tubes may be made of the same ceramic or of different ceramics. There is no restriction as to the shape, thickness and size of the perforated plates as well as to the number and arrangement of holes to be made in each perforated plate, and these parameters are appropriately determined depending upon the purpose of or conditions in using the present joined ceramic component. The holes of each plate may be formed simultaneously with the molding of the plate, or may be formed by punching, ultrasonic machining or the like after the molding of the plate. The setter may generally have the same shape as each plate does, except that the setter has no hole, and may be made of basically the same material as used for each plate.

The present invention is hereinafter described in more detail by way of Examples. However, the present invention is in no way restricted to these Examples.

EXAMPLE 1

To 1,000 g of a $Si_3N_4$ powder were added, as sintering aids, 10 g of $Y_2O_3$, 10 g of MgO and 5 g of $ZrO_2$ and, as an organic binder, 1 g of a polyvinyl alcohol. Further, 1,000 g of water was added. The mixture was ground and mixed for 4 hours by the use of an attriter and $Si_3N_4$ balls of 5 mm (diameter). The resulting material was dried by a spray dryer and subjected to granulation to obtain a powder. The powder was subjected to extrusion to obtain green tubes. The green tubes were dried at 110° C. for 10 hours and then subjected to calcination at 500° C. for 5 hours to burn out the binder. Further sintering was conducted at 1,650° C. for 1 hour to obtain tubes of 8 mm (outside diameter), 6 mm (inside diameter) and 600 mm (length). At one end of each tube was made a hole for inserting a pin thereinto to hang the tube.

Separately, two green plates were prepared using the same materials as used in the preparation of the tubes, by cold isostatic pressing (CIP) molding in which a pressure of 7 ton/cm$^2$ was applied. The green plates were subjected to drying and calcination (to burn out the binder) under the same conditions as used in the preparation of the tubes. Further calcination was conducted in a nitrogen atmosphere at 1,350° C. for 3 hours to obtain two plates of 350 mm×170 mm×20 mm (thickness). The plates were subjected to ultrasonic machining to form therein a plurality of holes (9.3 mm in diameter) for inserting the above tubes thereinto and effecting tube-plate joining, whereby two perforated plates were obtained.

Figure 3:
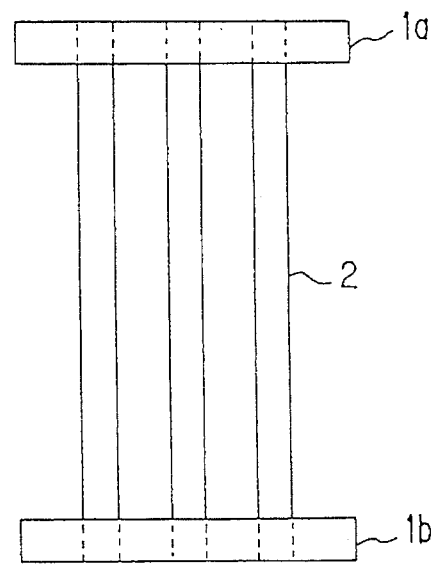
FIG. 3 is a side view showing a joined ceramic component.
Figure 4:
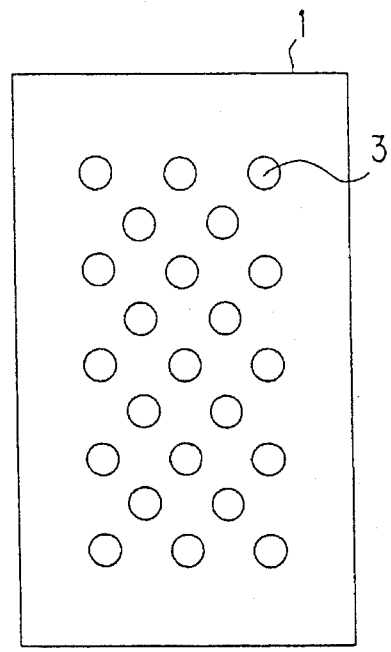
FIG. 4 is a plan view of a perforated plate.

Then, as shown in FIG. 1, a tungsten-made pin 6 was inserted into the hole of each tube 2; each tube 2 was inserted into one hole of the upper perforated plate 1a placed on jigs 5 and, by placing the two ends of each pin on the upper surface of the upper perforated plate 1a , each tube 2 was hanged from the upper perforated tube 1a; and the lower end of each tube 2 was inserted into one hole of the lower perforated plate 1b placed on a setter 4, to a certain depth. In this state, the resulting assembly was sintered in a nitrogen atmosphere at 1,600° C. for 3 hours to bond the perforated plates 1a and 1b and the tubes 2 into one piece. Incidentally, the setter 4 was produced in the same manner as used for the perforated plates except that no hole was formed in the setter 4, and the jigs 5 were sintered tubes produced using the same materials as used in production of the tubes. The interference in joining by sintering was 0.2 mm. After the joining by sintering, the upper end portion of each tube 2 projecting from the upper surface of the upper perforated plate 1a was cut off to obtain a joined ceramic component as shown in FIG. 3, consisting of tubes 2 and upper and lower perforated plates 1a and 1b joined to the both ends of the tubes 2. In the joined ceramic component, the perforated plates showed no cracking.

EXAMPLE 2

To 1,000 g of a $Si_3N_4$ powder were added, as sintering aids, 10 g of $Y_2O_3$, 10 g of MgO and 5 g of $ZrO_2$ and, as an organic binder, 1 g of a polyvinyl alcohol. Further, 1,000 g of water was added. The mixture was ground and mixed for 4 hours by the use of an attriter and $Si_3N_4$ balls of 5 mm (diameter). The resulting material was dried by a spray dryer and subjected to granulation to obtain a powder. The powder was subjected to extrusion to obtain green tubes. The green tubes were dried at 110° C. for 10 hours and then subjected to calcination at 500° C. for 5 hours to burn out the binder. Further sintering was conducted at 1,650° C. for 1 hour to obtain tubes of 8 mm (outside diameter), 6 mm (inside diameter) and 600 mm (length). At one end of each tube was made a hole for inserting a pin thereinto to hang the tube.

Separately, two green plates were prepared using the same materials as used in the preparation of the tubes, by CIP molding in which a pressure of 7 ton/cm² was applied. The green plates were subjected to drying and calcination (to burn out the binder) under the same conditions as used in the preparation of the tubes. Further calcination was conducted in a nitrogen atmosphere at 1,350° C. for 3 hours to obtain two plates of 350 mm×170 mm×20 mm (thickness). The plates were subjected to ultrasonic machining to form therein a plurality of holes (9.3 mm in diameter) for inserting the above tubes thereinto and effecting tube-plate bonding, whereby two perforated plates were obtained.

Then, as shown in FIG. 2, a tungsten-made pin 6 was inserted into the hole of each tube 2; each tube 2 was inserted into one hole of the upper perforated plate 1a placed on jigs 5 and, by placing the two ends of each pin on the upper surface of the upper perforated plate 1a, each tube 2 was hanged from the upper perforated tube 1a; and the lower end of each tube 2 was inserted into one hole of the lower perforated plate 1b separated from a setter 4 by the use of jigs 7. In This state, the resulting assembly was fired in a nitrogen atmosphere at 1,600° C. for 3 hours to bond the perforated plates 1a and 1b and the tubes 2 into one piece. Incidentally, the setter 4 was produced in the same manner as used for the perforated plates except that no hole was formed in the setter 4, and the jigs 5 were sintered tubes produced using the same materials as used in production of the tubes. The interference in joining by sintering was 0.2 mm. After the sintering joining, the upper end portion of each tube 2 projecting from the upper surface of the upper perforated plate 1a was cut off to obtain a joined ceramic component as shown in FIG. 3, consisting of tubes 2 and upper and lower perforated plates 1a and 1b joined to the both ends of the tubes 2. In the joined ceramic component, the perforated plates showed no cracking.

Comparative Example

A joined ceramic component was produced in the same manner as in Examples except that sintering was conducted in a state that, as shown in FIG. 5, no pin was used and the lower end of each tube 2 was inserted into one hole of the lower perforated plate 1b so that the lower front end of each tube 2 was flush with the lower surface of the lower perforated plate 1b, that is, the lower front end of each tube 2 was in contact with a setter 4. In the joined ceramic component, the lower perforated plate 1b showed cracking.

As described above, the present invention enables production of an excellent joined ceramic component consisting of a plurality of parallel ceramic tubes and two perforated ceramic plates bonded to the both ends of said tubes, by utilizing the difference in sintering shrinkage factor between said tubes and said plates, without inviting the destruction of setter and the consequent cracking of lower perforated plate during the sintering joining step.

What is claimed is:

1. A method for producing a joined ceramic component having a plurality of parallel ceramic tubes and two perforated ceramic plates joined to respective ends of said ceramic tubes, which method comprises:

arranging two unsintered ceramic plates, each plate having a plurality of holes, parallel to each other and also to a floor surface with a given distance provided between the plates to form an upper plate and a lower plate;

inserting ends of a plurality of sintered ceramic tubes into the holes of the upper and lower plates to form an assembly in which the tubes are arranged vertically to the floor surface and parallel to each other and between the upper and lower plates; and sintering the assembly to join the tubes and the plates into one piece by utilizing a difference in sintering shrinkage factor between the tubes and the plates, in which method the sintering is conducted in a state in which each tube is hanging from the upper plate, a lower end of each tube is situated in a hole of the lower plate, the lower plate is on or above a setter, and a certain distance is provided between the lower end of each tube and the setter so that the tubes and setter do not come in contact with each other during the sintering.

2. A process for producing a joined component according to claim 1, wherein the lower end of each tube is inserted into a hole of the lower plate to an appropriate depth of the hole.

3. A process for producing a joined component according to claim 1, wherein the lower plate and the setter are separated by jigs to provide a given distance between the lower end of each tube and the setter.

4. A method for producing a joined ceramic component comprised of a plurality of parallel ceramic tubes and two perforated ceramic plates joined to opposite ends of said ceramic tubes, said method comprising the steps of:

disposing a first unsintered perforated ceramic plate on or above a setter;

disposing a second unsintered perforated ceramic plate above said first plate;

inserting a plurality of sintered ceramic tubes into holes in said first and second plates;

hanging said tubes from said second plate so that a predetermined distance is provided between a lower end of each tube and said setter; and sintering said plates and said tubes to form said joined ceramic component by using a difference in sintering shrinkage factor between said plates and said tubes.

5. The method of claim 4, wherein the second plate is disposed above said first plate by a jig.

6. The method of claim 5, wherein said first plate is disposed above said setter by a jig.

7. The method of claim 4, wherein the step of hanging said tubes from said second plate so that a predetermined distance is provided between a lower end of each tube and said setter includes the steps of:

inserting a pin through a hole in an upper portion of each tube; and placing opposite ends of said pin on a top surface of said second plate.

8. The method of claim 4, wherein said tubes are parallel to each other.

9. The method of claim 6, wherein said tubes are parallel to each other.

10. The method of claim 7, wherein said pin is comprised of a ceramic material.

* * * * *